United States Patent
Li et al.

(10) Patent No.: US 7,958,142 B2
(45) Date of Patent: Jun. 7, 2011

(54) USER PROFILE AGGREGATION

(75) Inventors: Karvell Li, Bellevue, WA (US); Jamie Marconi, Seattle, WA (US); Rahul Kumar, Kirkland, WA (US); Miriam Borkenhagen, Bothell, WA (US); David Law, Seattle, WA (US); Gilbert McQuillan, Austin, TX (US); Munir Mahmood, Bellevue, WA (US); Gupta Garuda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 11/901,990

(22) Filed: Sep. 20, 2007

(65) Prior Publication Data

US 2009/0083367 A1    Mar. 26, 2009

(51) Int. Cl.
 G06F 17/30    (2006.01)
(52) U.S. Cl. ........ 707/770; 707/784; 707/803; 709/219; 715/240
(58) Field of Classification Search .............. 707/4, 770, 707/784, 803; 709/219; 715/240
See application file for complete search history.

(56) References Cited

U.S. PATENT DOCUMENTS

| | | | |
|---|---|---|---|
| 5,813,863 A * | 9/1998 | Sloane et al. ................. 434/236 |
| 6,285,999 B1 * | 9/2001 | Page ............................ 707/723 |
| 6,411,961 B1 | 6/2002 | Chen |
| 6,470,383 B1 * | 10/2002 | Leshem et al. ................ 709/223 |
| 6,901,378 B1 | 5/2005 | Linker et al. |
| 7,003,560 B1 | 2/2006 | Mullen et al. |
| 7,020,696 B1 | 3/2006 | Perry et al. |
| 7,152,070 B1 | 12/2006 | Musick et al. |
| 7,379,994 B2 * | 5/2008 | Collazo ......................... 709/224 |
| 2002/0035622 A1 | 3/2002 | Barber |
| 2002/0111887 A1 | 8/2002 | McFarlane et al. |
| 2003/0151621 A1 | 8/2003 | McEvilly et al. |
| 2003/0216936 A1 | 11/2003 | Saitoh et al. |
| 2004/0148347 A1 | 7/2004 | Appelman et al. |
| 2005/0132381 A1 | 6/2005 | Fiammante et al. |
| 2005/0160167 A1 | 7/2005 | Cheng et al. |
| 2005/0165643 A1 | 7/2005 | Wilson et al. |
| 2005/0188080 A1 | 8/2005 | Motsinger et al. |
| 2005/0188220 A1 | 8/2005 | Nilsson et al. |
| 2005/0240580 A1 * | 10/2005 | Zamir et al. ...................... 707/4 |
| 2005/0256839 A1 | 11/2005 | Leong et al. |
| 2005/0262119 A1 | 11/2005 | Mawdsley |
| 2006/0031377 A1 | 2/2006 | Ng et al. |
| 2006/0069717 A1 | 3/2006 | Mamou et al. |
| 2006/0095507 A1 | 5/2006 | Watson |

(Continued)

FOREIGN PATENT DOCUMENTS

WO    WO 0221263 A1    3/2002

(Continued)

OTHER PUBLICATIONS

Carey, et al., "Keep Your Data Flowing: Accessing Multiple Data Sources Made Easy", Date: Jan. 29, 2004, http://dev2dev.bea.com/pub/a/2004/01/carey_mangatani.html.

(Continued)

Primary Examiner — Shahid A Alam

(57) ABSTRACT

User profile data that may be spread across different service providers and that may vary across different service providers can be aggregated to provide an aggregate user profile. An aggregate user profile can be generated regardless of, among other things, varying user profile semantics, differing data formats, data item conflicts, evolving server protocols and interfaces, and updates to the number, identity, location, and type of servers upon which the service providers are maintained.

18 Claims, 9 Drawing Sheets

U.S. PATENT DOCUMENTS

| | | | |
|---|---|---|---|
| 2006/0235935 A1 | 10/2006 | Ng et al. | |
| 2006/0282778 A1 | 12/2006 | Barsness et al. | |
| 2007/0038610 A1* | 2/2007 | Omoigui | 707/769 |
| 2008/0147684 A1 | 6/2008 | Sadovsky et al. | |
| 2008/0228910 A1 | 9/2008 | Petri | |
| 2008/0288629 A1 | 11/2008 | Fisher et al. | |
| 2009/0164622 A1 | 6/2009 | Braam et al. | |
| 2009/0182873 A1 | 7/2009 | Spalink et al. | |
| 2010/0063884 A1 | 3/2010 | Aaron et al. | |
| 2010/0114941 A1 | 5/2010 | Von Kaenel et al. | |

FOREIGN PATENT DOCUMENTS

| | | |
|---|---|---|
| WO | 03094000 A2 | 11/2003 |

OTHER PUBLICATIONS

Chan, Joseph O., "Building Data Warehouses Using the Enterprise Modeling Framework", Date: 2004, vol. 13, No. 2.

Chan, Joseph O., "Toward a Unified View of Customer Relationship Management", Date: Mar. 2005, Schaumburg, IL, http://66.102.1.104/scholar?hl=en&lr=&q=cache:bOibFo20VC0J:professores.ea.ufrgs.br/hfreitas/disciplinas/ sig_adp/slides/CRM_Chan_unified_view.pdf+aggregate+data+%2B+profile+schema+%2B+silos.

Non-Final Office Action cited in related U.S. Appl. No. 11/903,138 dated Jul. 13, 2010.

"User Profiles and Their Management", Paavo Kotinurmi, 2001, 11 pgs., [online] htt://www.tml.tkk.fi/Studies/Tik-111.590/2001s/papers/paavo_kotinurmi.pdf.

Zhang et al., "Development of a self-adaptive Web search engine", Proceedings of the $3^{rd}$ International Workshop on Web Site Evolution, Date: Nov. 10, 2001 pp. 86-93.

Application as Filed for U.S. Appl. No. 11/903,138, filed Sep. 20, 2007.

* cited by examiner

USER PROFILE AGGREGATION

BACKGROUND

Many computing contexts involve the concept of a user profile, in which a computer system receives and retains a set of information describing one or more users of the system. In many such contexts, a server is developed to provide services (e.g., providing information, hosting files, or maintaining an email mailbox) to specific individuals, and the scope and details of the service may be personalized for each individual based on the individual's user profile. As one example, an individual may communicate with an email server by providing her email account username and password, and then communicate with other users via email that identifies her by her name and personalized email address. In this example, the email server maintains a user profile for the individual comprising her name, email address, account username, and account password, as well as many other facts relating to the identity of the individual.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An aggregated user profile of an individual in an environment of diverse and dynamic services is generated, where respective services retain a user profile for the individual comprising a distinctive set of user profile data items. Techniques are implemented for a coordinated plan for retrieving the data items from particular services, and for mediating conflicts in differing data items among the different services. Because the myriad services may be prone to frequent changes that may affect the user profiles stored therein and the manners of retrieving them, the coordinated plan might be advantageously designed to accommodate updating that reflects new logic for aggregating the user profile information from the various services. The coordinated plan might also be designed for communicating with various types of user profile services (e.g., XML web services, web services, text-based output services, etc.) and for fetching information from respective the services based on the service type. Some extensions are also discussed, such as techniques for propagating changes in aggregation logic to various services, and preparing various types of user profiles containing different sets of user profile information, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features will become apparent from the following detailed description when considered in conjunction with the annexed drawings.

DETAILED DESCRIPTION

Figure 1:
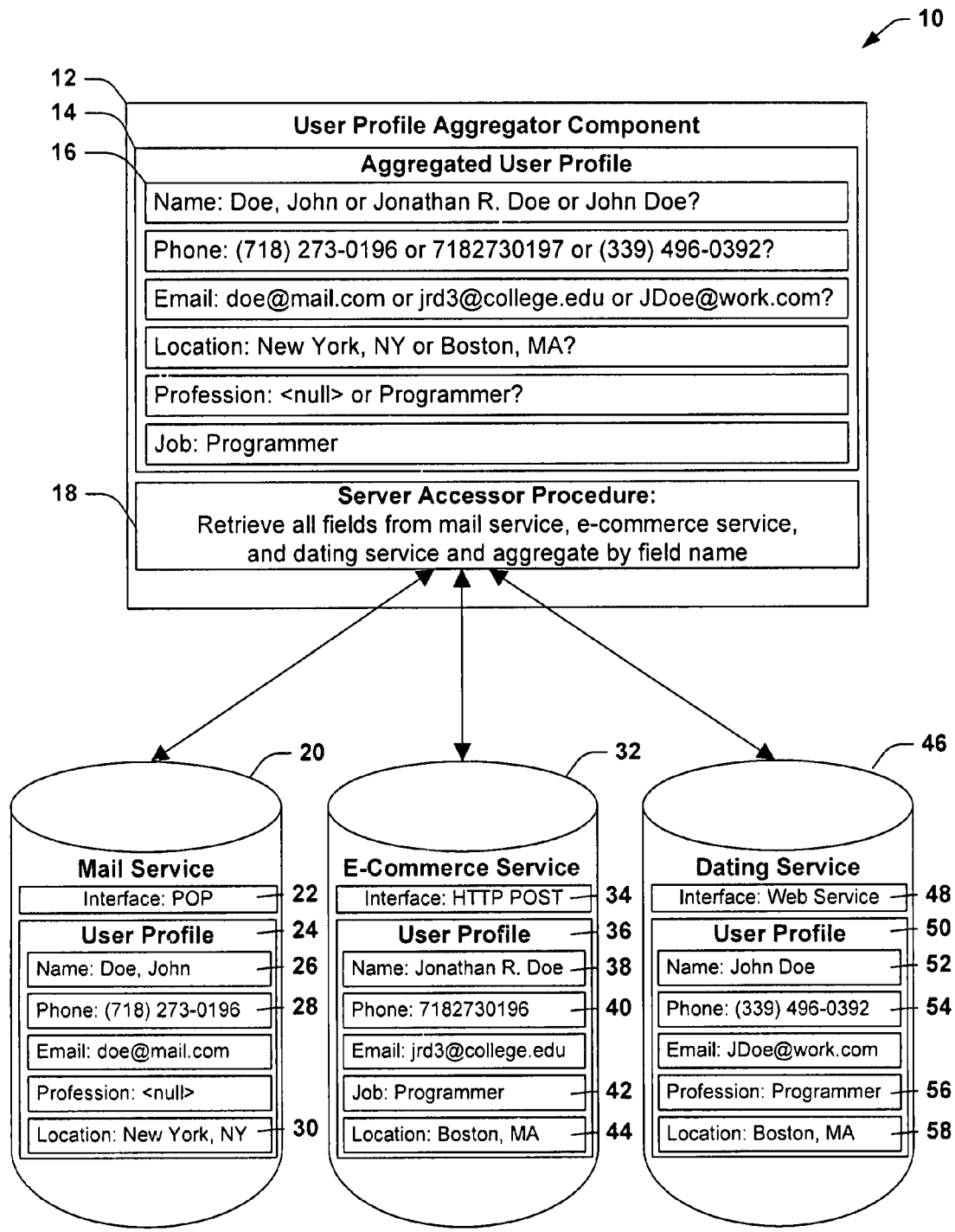
FIG. 1 is a system component diagram illustrating a system for generating an aggregate user profile from a plurality of user profile servers that does not utilize the techniques described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

This disclosure pertains to the provision of an array of services that may be often implemented by a computer server. The term "server" as used herein does not refer to a particular architecture used to provide this service, e.g., the network topology or computing configuration; it merely indicates that the service comprises a user profile data set including one or more one user profile data items, and is configured to fulfill requests for such information. The "server" might also comprise a plurality of servers working in tandem, e.g., a server farm. Each service may be offered to individual users, and may therefore retain a record of information regarding such individuals in a user profile, comprising a series of user profile data items. An "individual" may also represent a collection of people, such as the members of a class, an entity, such as a company or organization; etc.

A company or organization might provide many different services, and each service may prepare and retain a user profile for the individual who accesses the service. Such a company might wish to share data between and among services regarding the user profiles of a particular individual who may be using a plurality of such services. For example, a company might provide both email hosting (as a first service) and web hosting (as a second service), and may wish to retrieve information for an individual who is using both services, such as by preparing an aggregated user profile that combines the information pertaining to this individual in the email service user profile and the web service user profile. Each service may therefore provide a mechanism, e.g., an interface, for providing at least a portion of its user profile of at least some of its individual users upon request by other services, and may therefore operate as a user profile server. Moreover, it may be desirable to share this aggregated user profile information to a variety of clients, including other services within the domain of the company and outside parties. Indeed, the consumers of such a service might include the services participating in the aggregation, which could utilize the aggregated user profile information in order to synchronize its user profiles with those provided by the other user profile servers.

Accordingly, the owners of a set of user profile servers may wish to serve as a host of aggregated user profile data to be shared with a wide variety of clients and among the host's own services. An aggregation scheme might be devised for retrieving data from each of these user profile servers and combining the data into an aggregated user profile that may then be shared among the services and with authorized third parties.

However, this data sharing and user profile aggregation may be difficult, due to the different user profile stored by each user profile server. As one example, the individual may use the web hosting service for business purposes, and the web hosting service may have a user profile of this individual comprising business-related information (a business address, work telephone number, professional title, etc.); simultaneously, the user may use the email hosting service for personal correspondence, and the email service may have compiled a user profile comprising personal information (home address, personal mobile telephone number, job title, etc.) An attempt to aggregate these disparate user profiles into generic fields such as "mailing address" and "telephone number" may be complicated by the different kinds of information stored in the individual's user profile in each user profile server. As another example, the information in each user profile may conflict, and it may be difficult to choose which data to include in the aggregated user profile. As yet another example, each user profile server may store and provide access to the user profile information in different ways. An aggregation scheme may need to pull user profile data items from a first user profile server that discloses user profiles via an XML web service, a second user profile server that provides a text-based web query interface, such as an HTTP POST or HTTP GET interface, a third user profile server that provides an interactive text interface for answering user profile queries, such as a telnet session, and a fourth user profile service that simply outputs a complete list of users in a structured document, such as a flat text file, for example. It may be difficult to devise a technique to generate an aggregated user profile based on these various interfaces, particularly in an automated manner. Moreover, these complications may be compounded when the user profile is to be aggregated from a large number of user profile servers, each having a set of user profiles comprising disparate sets of information, and each providing user profile information in a distinctive manner that is subject to change as the service develops.

The problems described above are illustrated in FIG. 1, which depicts a system 10 for aggregating a user profile that does not operate in accordance with the techniques presented herein. This system 10 includes a user profile aggregator 12 that attempts to generate an aggregated user profile 14 based on the information for a user named John Doe stored in a plurality of user profile servers, one of which provides a mail service 20, another providing an e-commerce service 32 (e.g., an auction site or an internet merchant site), and a third providing a dating or matchmaking service 46. In each of these servers and services, a user profile 24, 36, 50 (respectively) is generated, each comprising a different set of user profile data items that pertain to the John Doe user. The user profile aggregator 12 attempts to generate an aggregated user profile 14 by combining the information in each of the user profiles 24, 36, 50 in each of the user profile servers 20, 32, 46. The user profile aggregator 12 includes a server accessor procedure 18 that is configured to contact the mail server 20, the e-commerce server 32, and the dating server 46 to retrieve information from each of the user profile servers and to aggregate it based on the names of the fields contained therein. Because the server accessor procedure 18 is embedded as a procedure within the user profile aggregator 12, these components are compiled together to form an executable binary (e.g., a code library, such as a DLL), and are therefore hard-coded to perform the logic embedded therein. The compiled, executable binary may be distributed to one or more clients that make use of the aggregated user profile 14.

Several practical problems exist with this system 10. As one example, because the different user profile servers 20, 32, 46 provide different types of services, John Doe has provided different information to them. For the "Phone" field, John may have provided a mobile phone number 54 for the dating service 46, and a home phone number 40 for the e-commerce service 32. Thus, each field may differ based on the type of service offered, which may give rise to conflicts that are difficult to resolve, especially in an automated manner. As a second example, the user profile servers 20, 32, 46 may contain conflicting information. For example, in the "Location" field, John is represented in the mail service 20 as a resident of New York, N.Y. 30, but is represented in the e-commerce service 32 and the dating service 46 as a resident of Boston, Mass. 44, 58. This conflicting data may arise due to staleness (e.g., John may have moved, and may not have updated the profile information in all of the user profile servers). As a third example, even where the fields are semantically identical and contain the same information, the information may have been entered in several variations; e.g., the "Name" field is present in the user profiles of all three user profile servers 20, 32, 46, but it identifies John in the mail service 20 as "Doe, John" 26, in the e-commerce service 32 as "John Doe" 38, and in the dating service 46 as "Jonathan Doe" 52. As a fourth example, the profiles may store the same data having the same semantics in different sections of the user profile; e.g., both the e-commerce service 32 and the dating service 46 identify John Doe's employment as "Programmer," but these fields are identified differently 42, 56 in the user profile schema 34, 48 of the user profile servers 32, 46. As a fifth example, the same user profile information might be stored in different formats on various user profile servers; e.g., the "Phone" field is stored in the mail service 20 as "(718) 273-0196" 28, and in the e-commerce service 32 as "7182730196" 40. Moreover, the server accessor procedure 18 is not configured to make preferential choices among conflicting data elements; it simply aggregates the data elements by field name, so each "Name" field 26, 38, 52 is combined to provide three conflicting names in the "Name" field 16 of John Doe's aggregated user profile 14. The result of these conflicting data elements is a hodgepodge of conflicting data in the aggregated user profile 14.

In addition to these data discrepancies, this system 10 also has architectural problems. As one example, the server accessor procedure 18 is configured explicitly to contact the mail service 20, the e-commerce service 32, and the dating service 46. If any of these three user profile servers is relocated (e.g., assigned a new IP address on the network) or taken out of the aggregation scheme, or if additional user profile servers are to be added to the user profile aggregation scheme, the internal logic of the server accessor procedure 18 may be difficult to update. As a second example, the server accessor procedure 18 is not configured to communicate with each user profile server 20, 32, 46 according to the communications protocol provided as an interface by each user profile server; e.g., it may not be configured to communicate with the mail server 20 through its POP interface 22, with the e-commerce service 32 through its HTTP POST interface 34, and with the dating service 46 through its web service interface 48. In fact, the server accessor procedure 18 may not even include information defining the communications protocol implemented by each user profile server 20, 32, 46. Moreover, if the protocol details change (e.g., if the web service interface 48 provided by the dating service 46 is updated to a new version that operates differently, or if the mail server 20 changes its interface 22 from a POP protocol to an IMAP protocol), the communications functionality included in the server accessor procedure 18 may fail. As yet another example, even if the server accessor procedure 18 were configured to make preferential decisions among the user profile data items provided by the various user profile servers 20, 32, 46 in case of a conflict, the hard-coded logic might not be easily adjusted to update the preferential decision-making process. In any of these cases, adjustments to the aggregation scheme may involve recompiling the user profile aggregator component 12 and the embedded server accessor procedure 18 into a new binary to be redistributed to every client of the user profile aggregator component 12. Where many user profile servers are involved that are frequently and independently updated, the aggregating logic may need to be frequently updated with sophisticated aggregation logic and redistributed as a compiled, executable binary to a wide number of clients, which may become infeasible.

This disclosure relates to techniques for aggregating a user profile from a plurality of user profile servers that each contain a user profile, wherein at least some of the problems exhibited in other types of systems, such as that depicted in FIG. 1, are mitigated. Some embodiments of these techniques may also exhibit additional properties that may be advantageous in various contexts.

One technique that may be advantageous relates to the set of information defining the logic for aggregating the user profile data items contained therein (e.g., the constituent user profile data items of the aggregated user profile, which user profile data items to request from each user profile server, which items are to be chosen in case of a conflict, etc.) In the problematic system 10 of FIG. 1, this information is hard-coded into the server accessor procedure 18, and cannot be easily updated. An alternative technique involves separating the specific aggregation logic from the executable binary that performs the aggregation. In this technique, the aggregation logic is represented as a user profile map, comprising an aggregating logic that specifies the retrieval of certain user profile data items from the user profiles stored in the user profile servers, and the decision-making logic for combining them (and to make preferential choices among conflicting items) into the aggregated user profile. A user profile aggregator component (e.g., an executable binary having basic functions for generically communicating with the user profile servers) may then read the user profile map and perform the retrieval of specific items and the aggregation into the aggregated user profile. Moreover, since the user profile map is just an information set, it might be implemented as a short, plain configuration file, such as an XML document, which may then be updated more easily (e.g., without requiring binary recompilation) than updating the hard-coded information in the compiled executable binary as implemented by the system 10 of FIG. 1.

Figure 2:
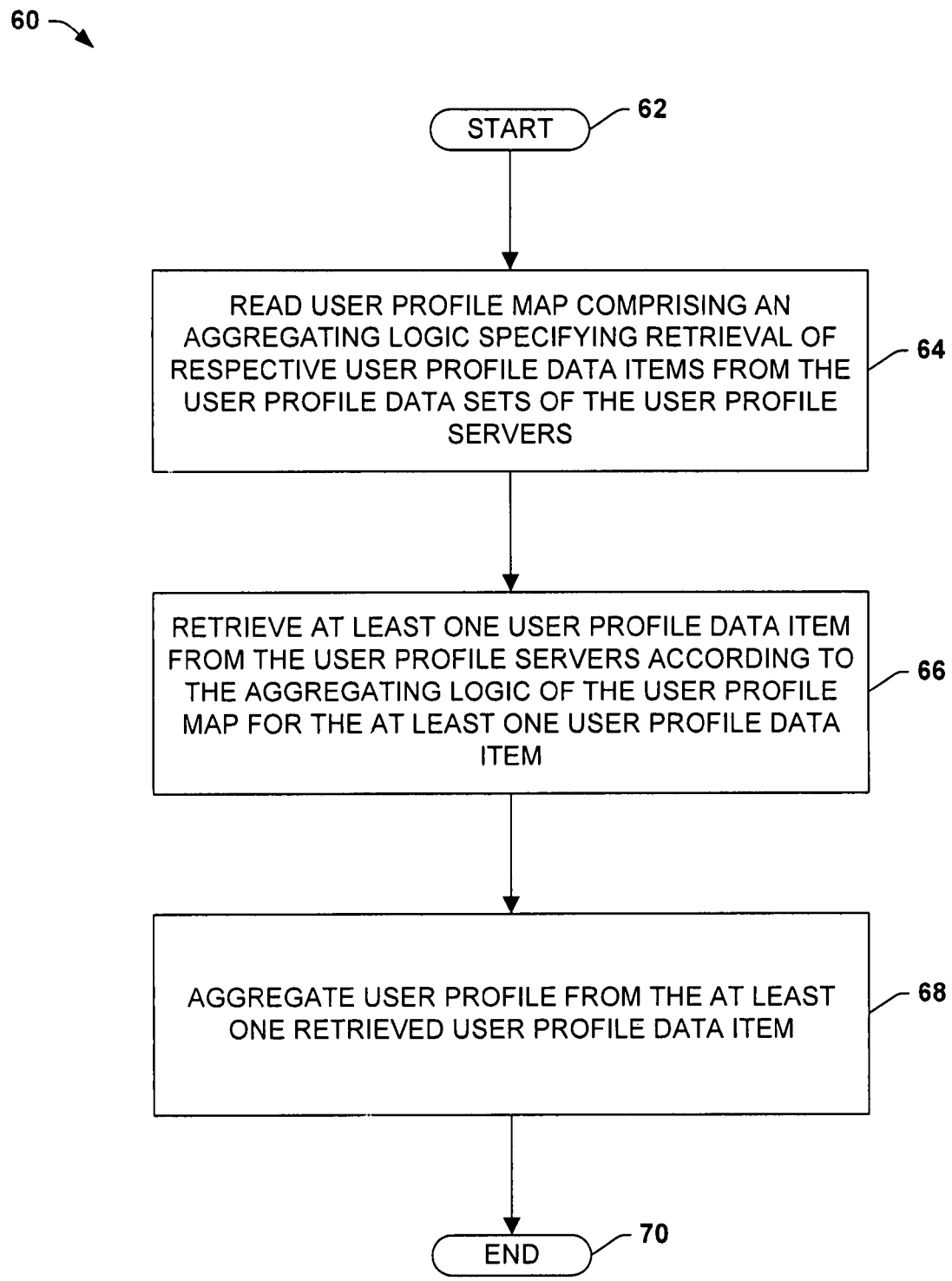
FIG. 2 is a flowchart illustrating an exemplary method for generating an aggregate user profile from a plurality of user profile servers.

FIG. 2 presents a flowchart that illustrates an exemplary method of aggregating a user profile comprising at least one user profile data item from at least one user profile server having a user profile data set. This method 60 begins at 62 and proceeds to read a user profile map comprising an aggregating logic specifying retrieval of respective user profile data items from the user profile data sets of the user profile servers 64. The method 60 also involves retrieving at least one user profile data item from the user profile servers according to the aggregating logic of the user profile map for the at least one user profile data item 66. The method 60 also involves aggregating the user profile from the at least one retrieved user profile data item 68. Having performed this reading 64, retrieving 66, and aggregating 68, the method 60 generates an aggregated user profile from the at least one user profile server, and therefore the method 60 ends at 70.

It will be appreciated that the exemplary method 60 of FIG. 2 may be varied in several ways that operate in accordance with the techniques described herein. As one example, the retrieving 66 may be initiated and completed before the aggregating 68. Alternatively, the retrieving 66 may be integrated with the aggregating 68, such that the user profile is aggregated by including items yielded by the retrieving 66. As another example, the user profile map may be read 64 to completion before the retrieving 66 and used to define the user profile data items retrieved by the retrieving 66. As an alternative, the retrieving 66 may retrieve all of the user profile data items from all of the user profile servers, followed by reading the user profile map 64 and applying it to select some of the user profile data items retrieved in 66 for aggregating 68. As a third example, the retrieving 66 may be performed on a per-user-profile-server basis by contacting (in serial or in parallel) each server to request all of the user profile data items to be retrieved from each, and then aggregating 68 the user profile based on the results. Alternatively, the retrieving 66 may be performed on a per-user-profile-data-item basis by contacting (in serial or in parallel) each server to request a particular data item, and then aggregating 68 each user profile data item into the aggregate user profile before turning to the next user profile data item. Other variations on the exemplary method 60 illustrated in FIG. 2 may be devised by those of ordinary skill in the art that operate in accordance with the techniques presented herein.

Figure 3:
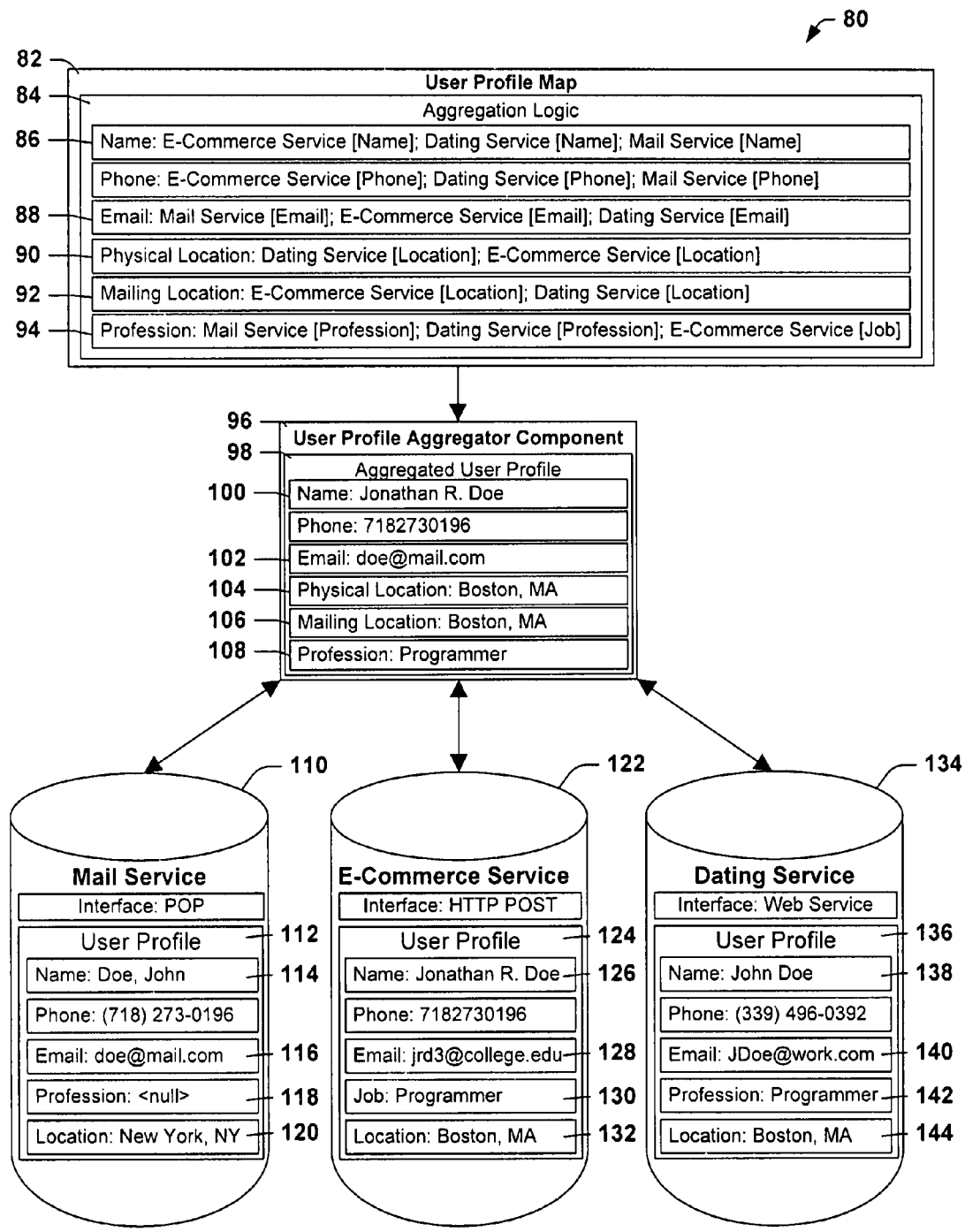
FIG. 3 is a system component diagram illustrating another exemplary system for generating an aggregate user profile from a plurality of user profile servers.

Another such technique is illustrated in the system component diagram of FIG. 3, which presents an example of a system for aggregating a user profile comprising at least one user profile data item from at least one user profile server having a user profile data set. This exemplary system 80 of FIG. 3 includes three user profile servers 110, 122, 134, each containing at least one user profile 112, 124, 136 comprising at least one user profile data item. In this example, the user profile servers 110, 122, 134 offer the same services (mail service, e-commerce service, and dating service) and contain the same user profile information as the user profile servers 20, 32, 44 in the system 10 of FIG. 1. The exemplary system 80 also includes a user profile map 82, which comprises an aggregation logic 84 that indicates which of the user profile items to retrieve from which of the user profile servers 110, 122, 124, and how to choose among conflicting user profile items for a particular user profile data item of the aggregated user profile 98. The exemplary system 80 also comprises a user profile aggregator component 96 configured to perform the aggregation by interacting with the user profile servers 110, 122, 134 and retrieving at least one user profile data item according to the user profile map 82. Accordingly, the user profile aggregator component 96 of this exemplary system 80 is configured to communicate generally with the user profile servers 110, 122, 134, but the logic for selecting particular user profile data items from particular user profile servers 110, 122, 134 and aggregating them into an aggregated user profile 98 is contained in the user profile map 82, which controls the performance of the aggregation by the user profile aggregator component 96.

In this exemplary system 80, the aggregation logic 84 specifies a plurality of user profile data items that will comprise the aggregated user profile 98 of a particular user. It will be appreciated that aggregating user profile information from two user profile servers may involve verifying that the user profiles in the user profile servers pertains to the same user. Many variations are available for performing this verification. As one example, a common identifier may be used among the user profile servers 110, 122, 134, such as a social security number or an arbitrarily assigned ID. As another example, different identifiers may be used to match the user among various user profile services; e.g., an arbitrarily assigned ID may be used to match user profiles between the mail service 110 and the e-commerce service 122, and a common social security number may be used to match user profiles between the e-commerce service 122 and the dating service 134. As a third example, a plurality of user profile elements may be used as a matching identifier (e.g., matching with both email address and telephone number), or a subset of identifiers (e.g., matching with at least two of a name, a birthdate, an email address, and a telephone number.) As a fourth example, the user profile services 110, 122, 134 may be configured to match user profiles through a centralized authenticating service. Many variations of the user profile matching may be devised by those of ordinary skill in the art that incorporate the techniques discussed herein.

Each user profile data item to be included in the aggregated user profile 98 is to be obtained from one or more user profiles 112, 124, 136 provided by the user profile servers 110, 122, 134, and these locations are listed in order of decreasing preference. For example, according to the "Name" field 86 of the aggregation logic 84, the "Name" user profile data item 100 that is included in the aggregated user profile 100 is to be chosen from (in order of decreasing preference) the "Name" field 126 stored in the e-commerce server 122, the "Name" field 138 stored in the dating server 134, and the "Name" field 114 stored in the mail service 110. The selection and ordering in this example are chosen based on the credibility of each user profile data item in each user profile server. For example, the "Name" field might be considered more reliable as provided by the e-commerce server 122 (which may include a name matching the bearer of a credit card used to pay for orders) than in the dating server 134 (which the user may more colloquially present), which may in turn be more reliable than the mail server 110 (where the user may be less compelled to enter a correct name.) By contrast, for the "Email" field may be considered more reliable as provided by the mail service (which canonically controls its allocation of email addresses) than in the e-commerce server (which might have an incorrect or null address.)

The exemplary system 80 of FIG. 3 operates in the following manner. As noted hereinabove, the user profile aggregator component 96 begins by reading the user profile map 82. The retrieving then begins with the first field listed in the aggregation logic 84, which is the "Name" field 86 in the illustrated example. In accordance with the aggregation logic for the "Name" field 86, the user profile aggregator component 96 first queries the e-commerce server 122 for the name of the individual. If the e-commerce server 134 were to provide an acceptable name for this individual, then the user profile aggregator 96 component moves on to the "Phone" field. On the other hand, if the e-commerce server 122 were unable to fulfill this retrieval request—e.g., if the e-commerce server 122 were inaccessible, or if the e-commerce server 122 did not contain a field named "Name", or if the e-commerce server 122 did not contain a record for this individual, or if the e-commerce server 122 contained a record for this individual having a "Name" field 126 that is blank or invalid, etc.—then the user profile aggregator component 96 next queries the dating server 134 for the name of the individual, and so on. Upon completing the retrieval as instructed by the user profile map 82, the user profile aggregator component 96 aggregates the retrieved data items into the aggregated user profile 98.

The configuration of the exemplary system 80 of FIG. 3 produces an improved aggregate user profile 98 as compared with the aggregate user profile 14 produced by the problematic system 10 of FIG. 1. As one example, the system of FIG. 3 resolves conflicts between user profile data items stored in the user profiles 112, 124, 136 of the user profile servers 110, 122, 134 by querying the most credible source of the user profile data item first, and accepting a valid response without needing to retrieve or compare less credible user profile data items on the other user profile servers. For example, in aggregating the "Profession" user profile data item 108 for the aggregated user profile 98, the user profile map 82 contains a "Profession" aggregation record 94 that prefers the "Profession" field 118 in the mail server 110 over the "Profession" field 144 in the dating server 134. In aggregating the user profile of John Doe, the user profile aggregator component 96 first retrieves the "Profession" field 118 from the mail server 10, but this returns a <null> result; perhaps John Doe has not specified his profession for his account in the mail server 110. The user profile aggregator component 96 then turns to the "Profession" field 144 in the dating service 134, which returns the acceptable user profile data item of "Programmer." The user profile aggregator component 96 therefore chooses this information for the "Profession" field 108 of the aggregated user profile 98 of John Doe, without having to request the "Job" field 130 from the e-commerce server 122, since it is, theoretically, less credible than the same information provided by the dating server 134.

As another example of the improvement of the aggregated user profile of FIG. 3 as compared with the aggregated user profile of FIG. 1, the former system 80 permits more sophisticated aggregation based on variations in the user profiles 112, 124, 136 of the user profile servers 110, 122, 134. As one example, the user profile map 82 of FIG. 3 can produce a user profile data item for the aggregated user profile 98 by retrieving differently named user profile data items from the user profiles in the user profile servers. In FIG. 3, the aggregation logic 84 contains a "Profession" aggregation record 94 that is aggregated from the "Profession" field 118 of the mail server 110, the "Profession" field 142 of the dating server 134, and the "Job" field 130 of the e-commerce service 122. This flexibility may be important where the user profile servers are independently managed, and therefore may not have uniform user profiles. As another example, the system 80 of FIG. 3 attempts to include in the aggregated user profile both a "Physical Location" user profile data item 104, which may be the likely location of the individual, and a "Mailing Location" user profile data item 106, which may be the location where the individual prefers to have packages sent. The former user profile data item 104 might be more credibly indicated by the "Location" field 144 in the dating server 134 than the "Location" field 132 in the e-commerce server 122, whereas the latter user profile data item 106 might be more accurately represented in the e-commerce server 122 than in the mailing server 134.

The configuration of the exemplary system 80 of FIG. 3 also features some architectural advantages over the problematic system 10 of FIG. 1. In the system 10 of FIG. 1, the aggregating logic is hard-coded into server accessor procedure 18 within the executable binary comprising the user profile aggregator component 12. If the host provides aggregated user profiles 14 to a large number of client machines, including some outside of the control of the host (e.g., its customers or industrial partners), then the user profile aggregator component 12 may be broadly deployed. Updates to the user profile aggregator component 12, including to the aggregation logic, may involve recompilation and redistribution to many client machines, each of which may depend on a specialized version of the user profile aggregator component 12 (e.g., compilation targeting a particular platform, such as the Microsoft Windows® platform or a Linux distribution.) This scenario may result in many versions of the user profile aggregator components in simultaneous operation, which may cause many software management issues. By contrast, in the system 80 of FIG. 3 implemented according to the techniques provided herein, the user profile map 82 is a separate component from the user profile aggregator component 96. Changes to the aggregation logic 84 (e.g., retrieving additional user profile data items, or in a different order, or from different user profile servers) may be enforced simply by replacing the user profile map 82. A request for an aggregated user profile 96 may therefore begin by retrieving the latest user profile map 82 and proceeding according to the information provided therein. As a result, the user profile aggregation scheme may be more easily kept up-to-date among all current clients of the user profile aggregation service without the need to recompile or redistribute an executable binary.

Systems implemented according to these techniques, such as the exemplary system of FIG. 3, may be devised in many configurations that may have various advantages and disadvantages. As one example, the user profile map 82 may be formatted in many variations, such as a file structured according to a markup language such as XML, or a relational database file, or a plain text file, etc. As another example, the user profile map 82 may be composed and/or maintained manually by a system administrator, or may be computationally generated (e.g., by an artificial intelligence, such as a backpropagating neural network, or a statistically driven algorithm, such as a Bayesian classifier system.) As yet another example, and as discussed with relation to the method of FIG. 2, the reading, the retrieving, and the aggregating may be performed by the user profile aggregator component 96 in various orders, and in serial or in parallel, and some of these elements may be interleaved, overlapped, sequential, and/or concurrent. For example, the user profile aggregator component 96 may operate on a per-user-profile-data-item order, such as by reading an item from the user profile map, retrieving it from the user profile servers, and aggregating it into the aggregate user profile.) As yet another example, the user profile aggregator component 96 may mediate conflicts by querying the user profile servers 110, 122, 134 in preferential order, such as described hereinabove. Alternatively, the user profile aggregator component 96 might query all of the user profile servers 110, 122, 134 for the user profile data item, and might then choose the user profile item that has been most recently updated. As a second alternative, the user profile aggregator component 96 might choose one by consensus among all of the user profile servers 110, 122, 134. Many such system implementations may be devised by those of ordinary skill in the art that operate in accordance with the techniques presented herein.

The techniques described herein (including the methods and systems so described, including the exemplary method of FIG. 2 and the exemplary system of FIG. 3) may be implemented in variations that may present additional advantages. FIGS. 4, 5A, 5B, 6, and 7 illustrate some of these variations.

Figure 4:
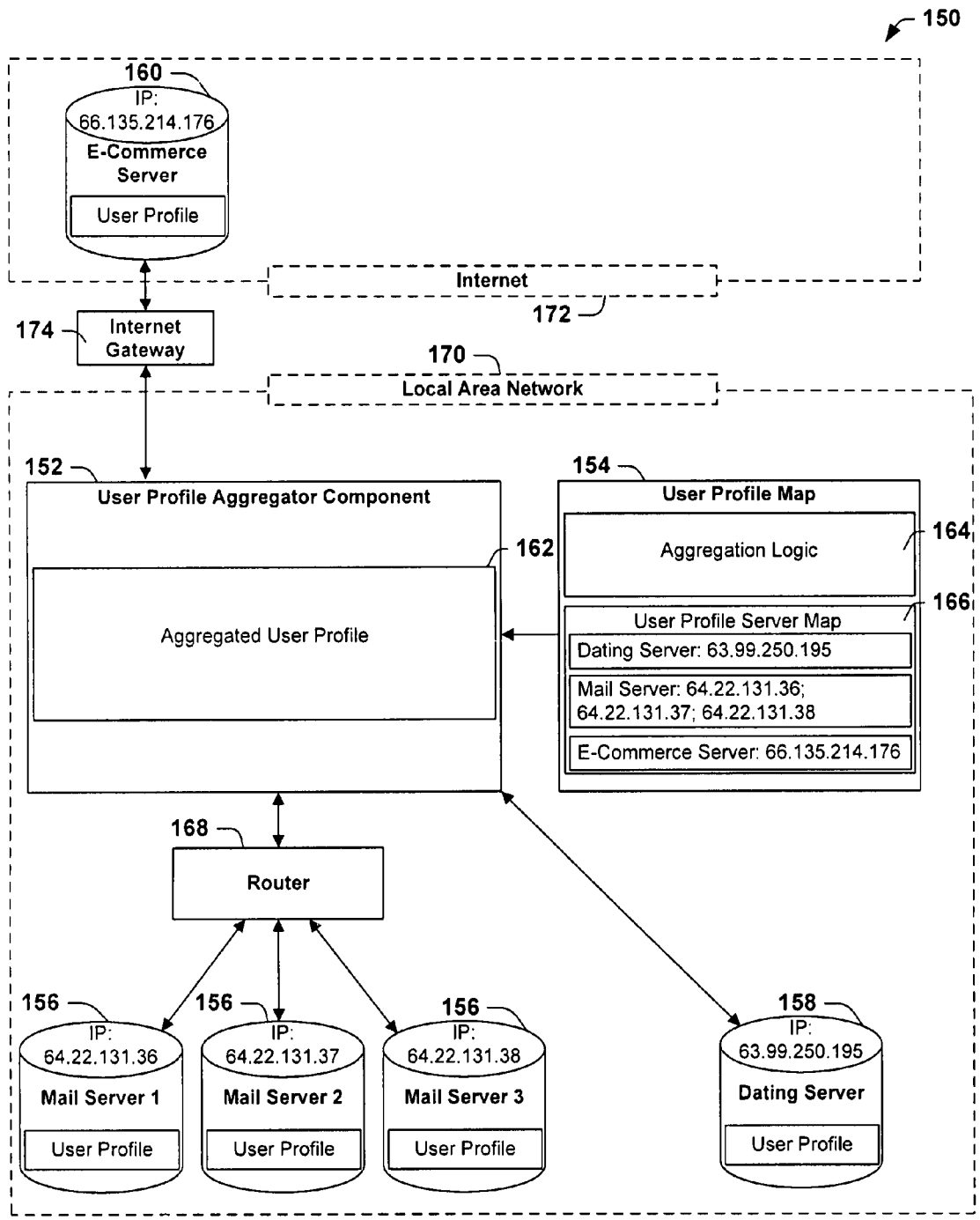
FIG. 4 is a system component diagram illustrating yet another exemplary system for generating an aggregate user profile from a plurality of user profile servers.

FIG. 4 illustrates a variation of these techniques that includes a user profile server map that identifies the location of at least one of the user profile servers. In systems implementing these techniques, the user profile aggregator component may be configured to locate at least one user profile server according to the user profile server map; and in methods performing these techniques, the retrieving may locate at least one user profile server according to the user profile server map. FIG. 4 illustrates a system 150 comprising a user profile aggregator component 152 and a user profile map 154 that contains information for retrieving user profile data items from user profile servers 156, 158, 160 for generating an aggregated user profile 162. The user profile map 154 of this exemplary system 150 includes the aggregation logic 164, and also a user profile server map 166, which specifies location information that helps identify the user profile servers 156, 158, 160. In this example, the user profile server map 166 specifies the IP addresses of the various user profile servers 156, 158, 160. This information may be advantageously included in the user profile map 154 for permitting easier updating of the aggregation scheme to add new user profile servers, to change some user profile servers currently in use, or to remove some user profile servers from use. The aggregation logic 164 may specify retrieving some data items from the "dating server" 158, and the user profile server map 166 may indicate the location of this server 158, for example.

The inclusion of location information in the user profile server map 166 may permit some flexibility in the configurations of user profile servers. As one example, a service may be provided by a plurality of servers (e.g., for the purpose of load balancing or redundancy), and the user profile server map 166 may specify location information (e.g., IP address) for more than one server comprising a service. In the exemplary system 150 of FIG. 4, the mail service is provided by three mail servers 156, each with an individual IP address, and all three servers are identified by location in the user profile server map 166. As a result, the user profile aggregator component 152 may attempt to contact various servers for this service 156 in case one such attempt fails due to hardware or network errors. (Alternatively, redundant user profile servers 156 may be connected through a router 168, such as a network address translator, that handles the distribution of requests sent to a single IP address for load balancing, redundancy, etc.) As another example, the aggregation may include servers in other locations, such as servers located not within a local area network but over the internet. In the exemplary system 150 of FIG. 4, the user profile aggregator component 152, and user profile map 154 perform the aggregation by contacting the mail servers 156 and the dating server 158 that are located within the same local area network 170, but also contacts the e-commerce server 160 that is remotely deployed (e.g., over the internet 172). The e-commerce server 160 may, for example, be provided by a different company that is willing to share information and participate in the user profile aggregation. The user profile aggregator component 152 may therefore contact the e-commerce server 160 across the internet 172 (e.g. through an internet gateway 174), while fetching user profile data items and generating the aggregated user profile.

Another variation of these techniques includes at least one user profile server type accessor configured to retrieve at least one user profile data item from a user profile server type. As noted in the discussion of FIG. 1, for a plurality of user profile servers that offer different kinds of user services (e.g., mail vs. e-commerce) and may be developed by independent teams, it may be difficult to create a user profile aggregator component that is capable of communicating with each user profile server in a unified or generic manner. The aggregation may involve interfacing with different types of user profile servers in different manners (e.g., according to different communications protocols), while retrieving the user profile data items. For example, one user profile server may be equipped to provide user profile information by email, and may therefore communicate with the user profile aggregator component via a POP communications protocol; a second user profile server may provide user profile information via an HTTP POST interface (e.g., an HTML form that is processed by a server-side CGI script); and a third user profile server may provide user profile information via an XML web service. Therefore, depending on the user profile server type, a specific communications protocol may be used. Moreover, these user profile servers may change the protocols associated with these interfaces over time, and new user profile servers may be added to the user profile aggregation scheme that communicate via the same or new interfaces. In order to provide for varying and dynamic interfacing with various user profile servers, it may be advantageous to include in the user profile aggregator component one or more user profile server type accessors that are configured to communicate with different kinds of user profile servers for retrieving various user profile data items. Each user profile server in the user profile aggregation scheme may then be contacted through a compatible user profile server type accessor (e.g., a POP mail server may be paired with a POP protocol user profile server type accessor), which may arbitrarily retrieve the user profile data items according to the aggregation logic.

Figure 5A:
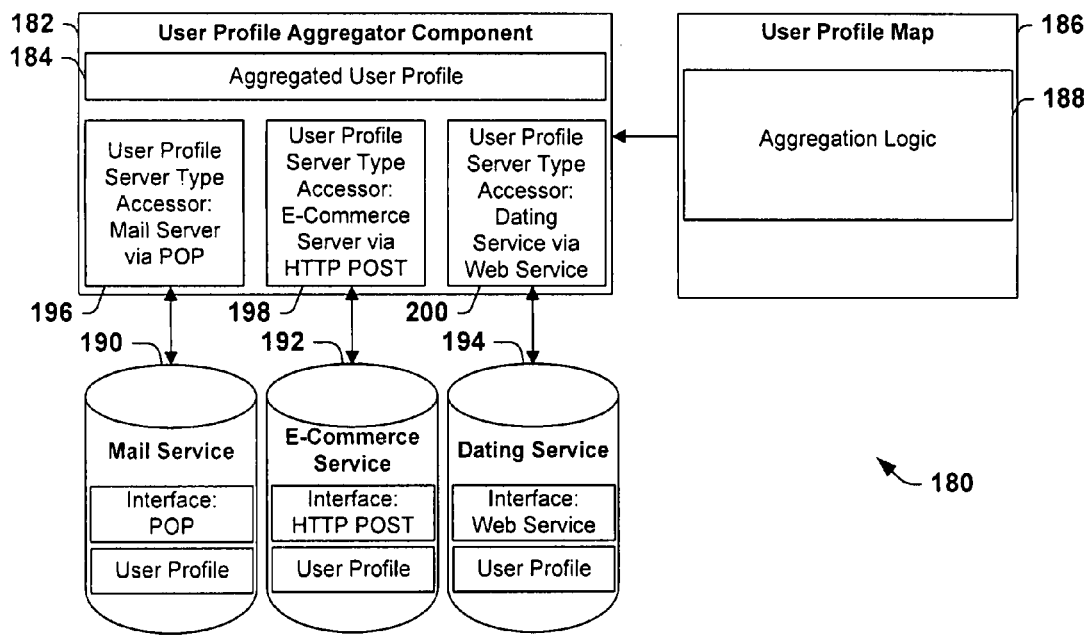
FIG. 5A is a system component diagram illustrating yet another exemplary system for generating an aggregate user profile from a plurality of user profile servers.
Figure 5B:
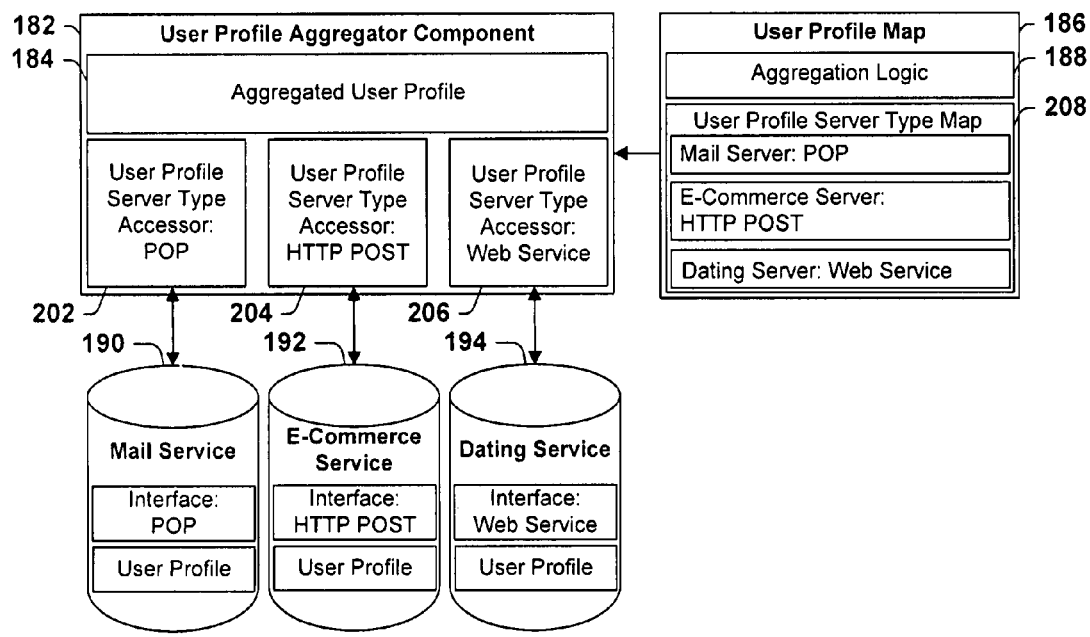
FIG. 5B is a system component diagram illustrating yet another exemplary system for generating an aggregate user profile from a plurality of user profile servers.

FIGS. 5A and 5B illustrate two exemplary systems that incorporate a plurality of user profile server type accessors. In both FIGS. 5A and 5B, the system 180 includes a user profile aggregator component 182 configured to generate an aggregated user profile 184 by utilizing a user profile map 186 comprising an aggregation logic 188, and by retrieving user profile data items from three profile servers 190, 192, 194. However, in the exemplary system 180 of FIG. 5A, the user profile aggregator component 182 includes a plurality of user profile server type accessors 196, 198, 200, each configured to communicate with one of the user profile servers 190, 192, 194 included in the aggregation scheme. For example, the mail service user profile server type accessor 196 is configured to communicate via POP with the mail server 190, and the e-commerce server user profile server type accessor 198 is configured to communicate via the HTTP POST interface of the e-commerce server 192. The user profile aggregator component 182 may therefore generically request user profile data items for aggregation, and may rely on the user profile server type accessors 196, 198, 200 to communicate with the user profile servers 190, 192, 194 in the appropriate communications protocol.

FIG. 5B presents another exemplary system 180 that similarly relies on user profile server type accessors, but in a different manner. In this system 180, the user profile server type accessors 202, 204, 206 are not configured to communicate with particular user profile servers, but rather according to different protocols. For example, a first user profile server type accessor 202 is provided to communicate with any user profile server having a POP protocol interface, such as the mail server 190; and a second user profile server type accessor 204 is provided to communicate with any user profile server having an HTTP POST protocol interface, such as the e-commerce server 192. Moreover, rather than directly associating each user profile server type accessor with a corresponding user profile server, the exemplary system 180 of FIG. 5B includes in the user profile map 186 a user profile server type map 208 that identifies a user profile server type for the user profile servers 190, 192, 194. When the user profile aggregator component 182 reads the user profile map 186, it may retrieve at least one of the user profile data items from at least one of the user profile servers through the user profile server type accessor configured to retrieve at least one user profile data item from the user profile server type of the user profile server according to the user profile server type map. For example, when the aggregation logic 188 specifies the retrieval of a user profile data item from the dating service 194, the user profile aggregator component 182 may consult the user profile server type map 208 to determine that the dating service 194 provides a web service interface, and may therefore utilize the web service user profile server type accessor 206 to communicate with this user profile server 194. This exemplary system 180 may provide an advantage of easier updating of the interface information for the user profile servers (e.g., when a user profile server changes interface types, or when a new user profile server is added to the aggregation scheme having a particular kind of interface.) Such changes may involve simply updating the user profile map, and may avoid recompiling and redistributing the executable binary comprising the user profile aggregator component 182.

A third variation of these techniques relates to the formulation of multiple user profile types, each such user profile type containing a different type of information. For example, an account user profile type may comprise account information, such as the individual's username, password, account type, and security permissions for various services. A shared user profile type may comprise information that the individual is comfortable publicly sharing, such as name, physical location, profession, and birthdate. An aggregate user profile type may comprise a more comprehensive set of information retrieved from a broader array of services. Accordingly, a system featuring such user profile types may comprise a user profile aggregator component configured to aggregate the user profile from the at least one retrieved user profile data item according to a user profile type. Similarly, a method featuring such user profile types may perform the aggregating by aggregating the user profile from the at least one retrieved user profile data item according to a user profile type.

Figure 6:
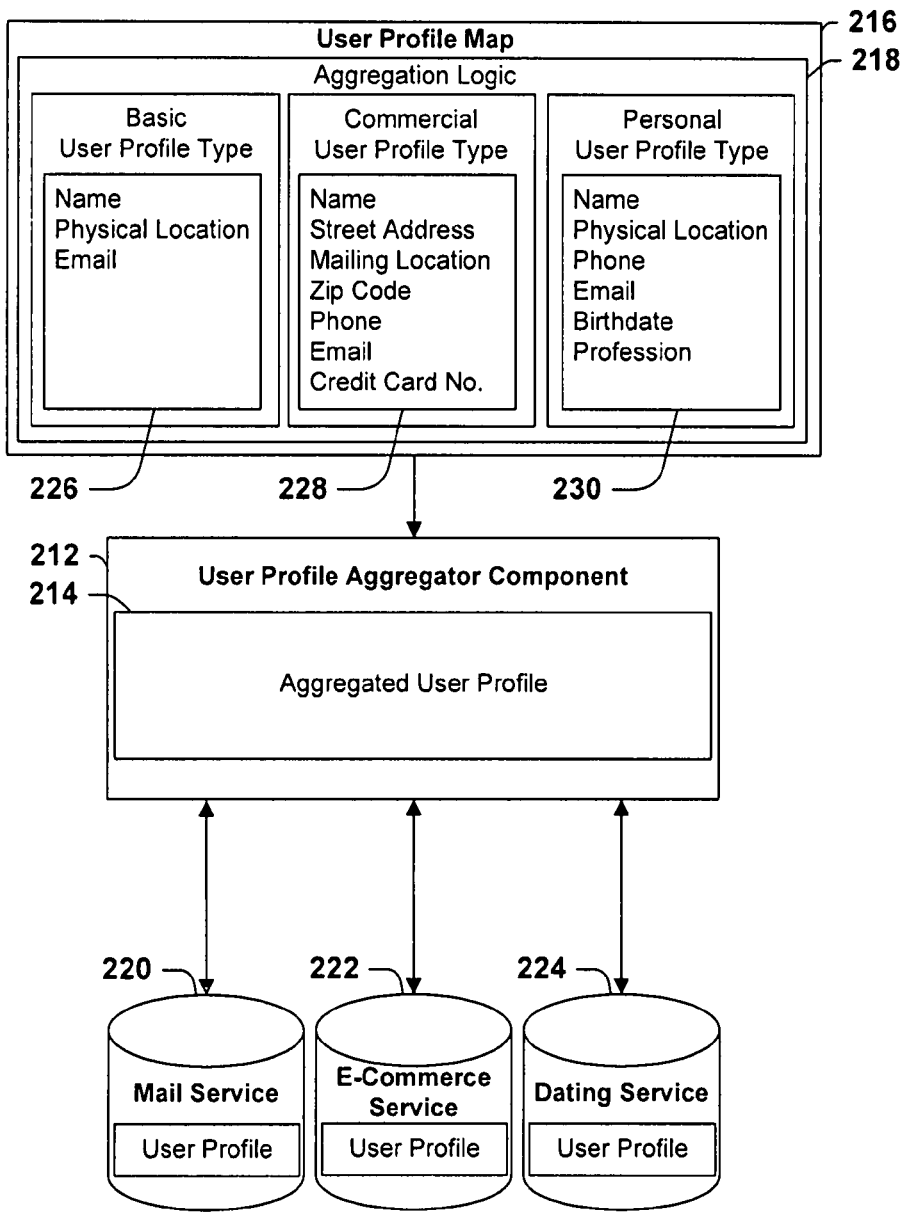
FIG. 6 is a system component diagram illustrating yet another exemplary system for generating an aggregate user profile from a plurality of user profile servers.

FIG. 6 illustrates an exemplary system for generating aggregated user profiles based on one of several user profile types. As in preceding exemplary systems, FIG. 6 illustrates another exemplary system 210 comprising a user profile aggregator component 212 configured to produce an aggregated user profile 214 by utilizing a user profile map 216 comprising aggregating logic 218 and for retrieving user profile data items from user profile servers 220, 222, 224. However, the aggregation logic 218 of this exemplary system 210 contains information for generating several types of aggregated user profiles: a basic user profile type 226 containing only very general information about the individual; a commercial user profile type 228 containing commercial information; and a personal user profile type 230 containing more personal information. Each user profile type 226, 228, 230 may comprise an aggregation logic for retrieving different user profile data items from the user profile-servers 220, 222, 224.

The aggregation of user profiles based on a plurality of user profile types may be implemented in many variations. As one example, the choice of user profile type to generate may be based on several criteria. For example, the user profile aggregator component may permit clients to select a user profile type that they wish to receive for an individual. Alternatively, the user profile aggregator component may select a user profile type based on the nature of the individual (e.g., individuals may be represented as business users, personal services users, both, etc.) As a second alternative, the user profile aggregator component may restrict access to different sets of information to different types of clients. For example, the host providing the aggregated user profiles may generate commercial user profile types only for its e-commerce clients, and may generate personal user profile types only for its personal services clients. This arrangement facilitates the protection of users' information by extending only limited subsets of the individual's user profile, based on the identity of the user profile consumer who is requesting the aggregated user profile. As another example, the user profile aggregator component may perform the aggregation in various manners. For example, the user profile aggregator component may request all of the user profile data items from the respective user profile servers, and may then selectively aggregate the profile based on the selected user profile type. Alternatively, the user profile aggregator component may retrieve from the user profile servers only the user profile data items specified by the aggregating logic for the selected user profile type.

A fourth variation of these techniques relates to the implementation of the user profile aggregation service. In one example, the user profile aggregation service may be completely centralized, wherein the user profile aggregator component is retained inside the host providing the aggregation service and exposed to clients through a generic interface for interaction with a human (e.g., a website) or with another machine (e.g., an XML web service.) Although this implementation provides more control over the user profile aggregator component, the computational burden is also centralized, and a great deal of processing power may be involved in executing the methods embodied in the user profile aggregator component on behalf of all clients of the service. Alternatively, the user profile aggregator component may be compiled and distributed to clients—potentially a wide array of such clients—and the host may provide the user profile map that is utilized by the user profile aggregator component. Accordingly, the host may provide the user profile map to clients via a user profile map server, and the user profile aggregator component may begin the aggregation by retrieving the user profile map from the user profile map server. In this way, the host may retain control of the aggregated user profile service and facilitate up-to-date performance of the aggregation by the user profile aggregator component on behalf of various clients, while avoiding a centralized computing burden of the user profile aggregator component.

Figure 7:
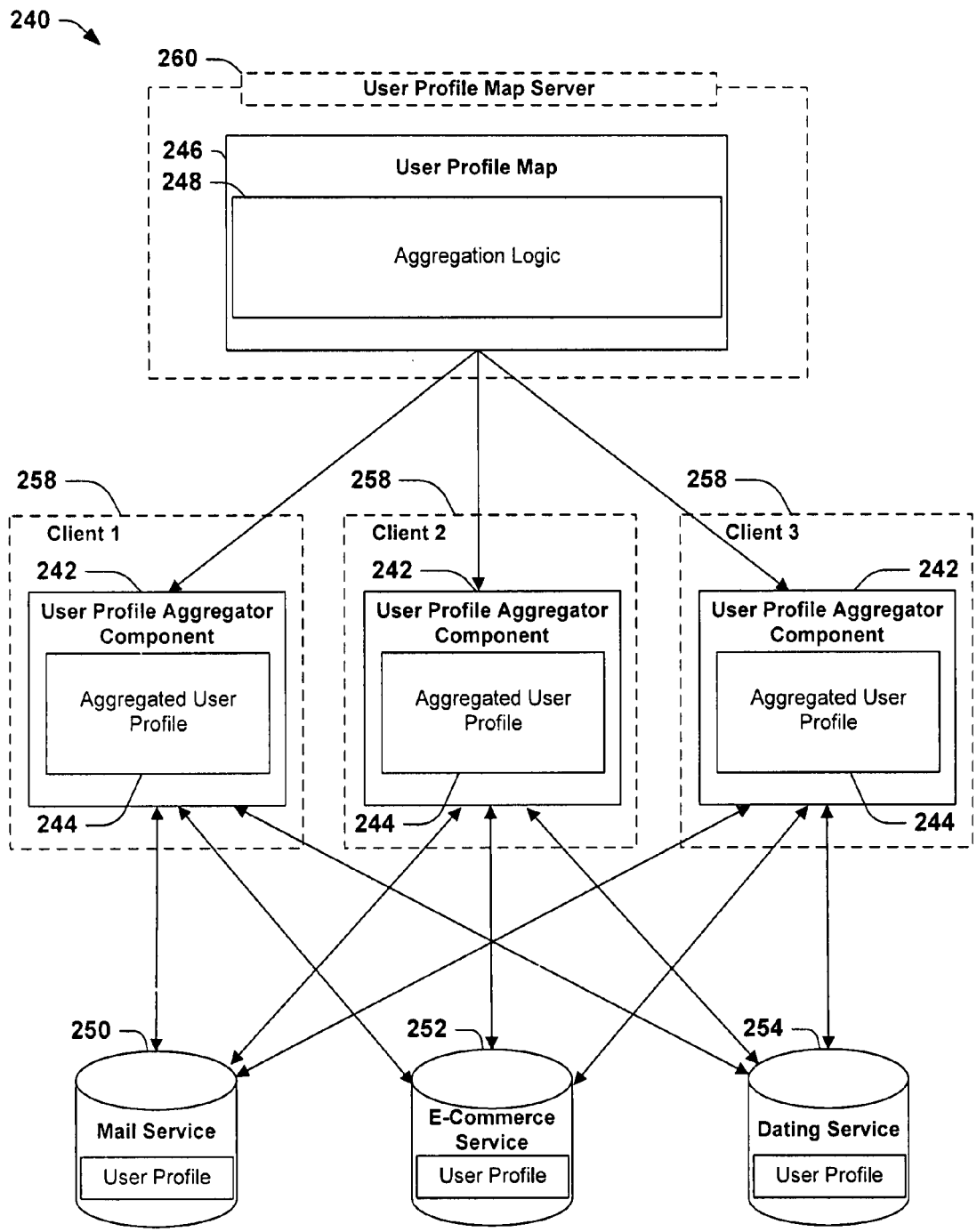
FIG. 7 is a system component diagram illustrating yet another exemplary system for generating an aggregate user profile from a plurality of user profile servers.

FIG. 7 illustrates an exemplary system that incorporates the concept of providing the user profile map on a user profile map server. This figure illustrates another exemplary system 240 comprising a user profile aggregator component 242 configured to produce an aggregated user profile 244 by utilizing a user profile map 246 comprising aggregating logic 248 and for retrieving user profile data items from user profile servers 250, 252, 254. However, in this exemplary system 240, the user profile aggregator component 242 is distributed to a variety of clients 258, each of which uses the user profile aggregator component 242 in a decentralized manner. The host retains control of the aggregation scheme by providing the user profile map 246 on a user profile map server 260, from which the user profile aggregator component 242 is configured to read the user profile map 246 upon commencing a user profile aggregation. The implementation of the user profile map server may be varied in many aspects, such as the server communications protocol (e.g., FTP, HTTP, network file sharing, etc.), authentication (e.g., providing the user profile map to all users upon request, or only to authenticated users who present valid security credentials, such as a username and password, etc.)

Figure 8:
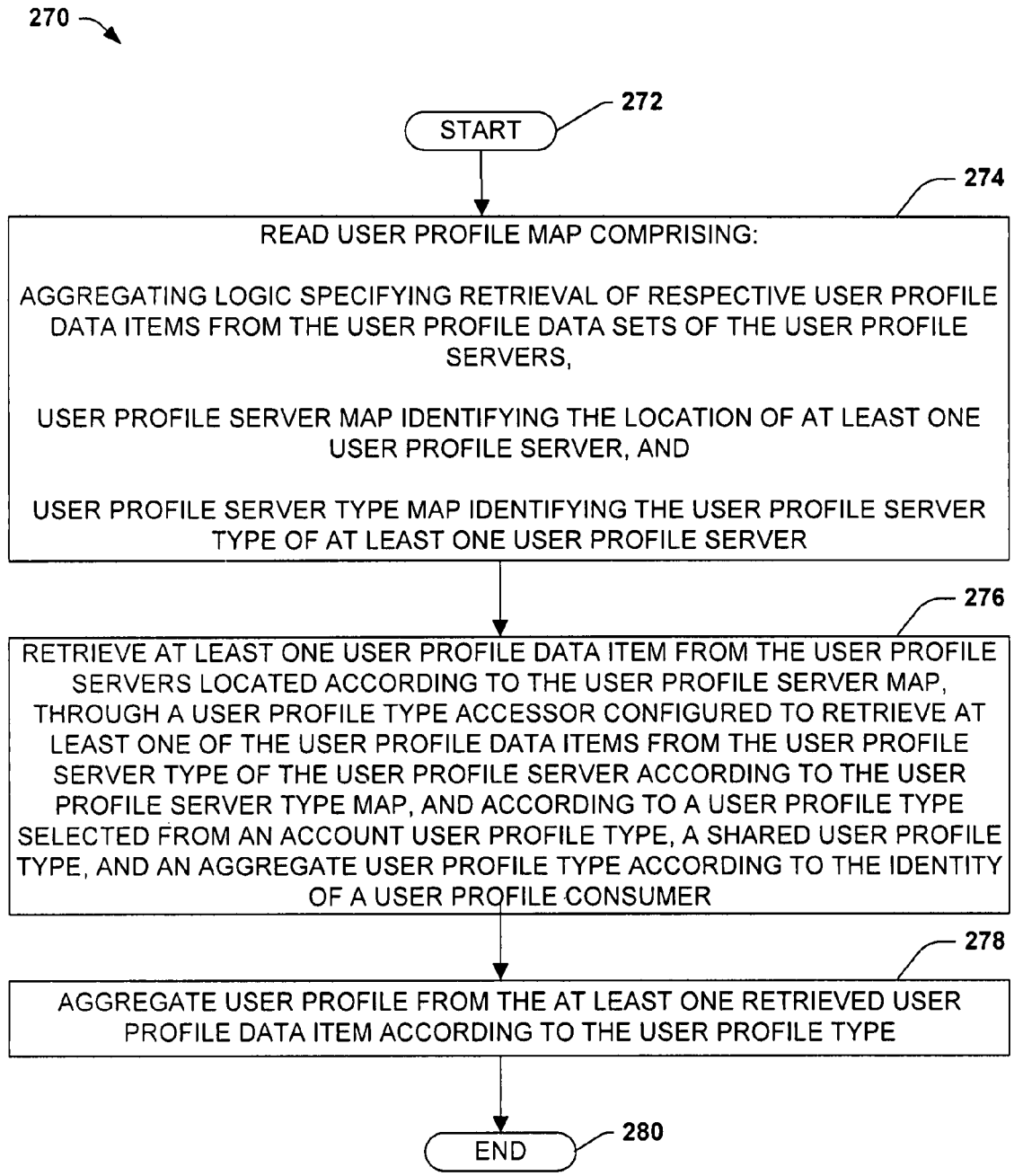
FIG. 8 is a flowchart illustrating another exemplary method for generating an aggregate user profile from a plurality of user profile servers.

The techniques described herein, and many variations thereof, may be embodied in many embodiments, such as in systems comprising components configured as discussed herein, or as computer-implemented methods that operate in accordance with these techniques. Moreover, the variants of these techniques may be combined to offer multiple and possibly synergistic advantages. One such combined embodiment is presented in FIG. 8, which presents a flowchart for an exemplary method of aggregating a user profile comprising at least one user profile data item from at least one user profile server having a user profile data set, which method incorporates several of the techniques herein discussed. The method 270 of FIG. 8 begins at 272 and involves reading a user profile map comprising an aggregating logic specifying retrieval of respective user profile data items from the user profile data sets of the user profile servers, a user profile server map identifying the location of at least one user profile server, and a user profile server type map identifying the user profile server type of at least one user profile server 274. The method 270 also involves retrieving at least one user profile data item from the user profile servers located according to the user profile server map, through at least one user profile accessor configured to retrieve at least one of the user profile data items from the user profile server type of the user profile server according to the user profile server type map, and according to a user profile type selected from an account user profile type, a shared user profile type, and an aggregate user profile type according to the identity of a user profile consumer 276. The method 270 also involves aggregating the user profile from the at least one retrieved user profile data item according to the user profile type. Having performed the reading 272, retrieving 274, and aggregating 276, the method 270 produces an aggregated user profile, and therefore the method 270 ends at 278.

Figure 9:
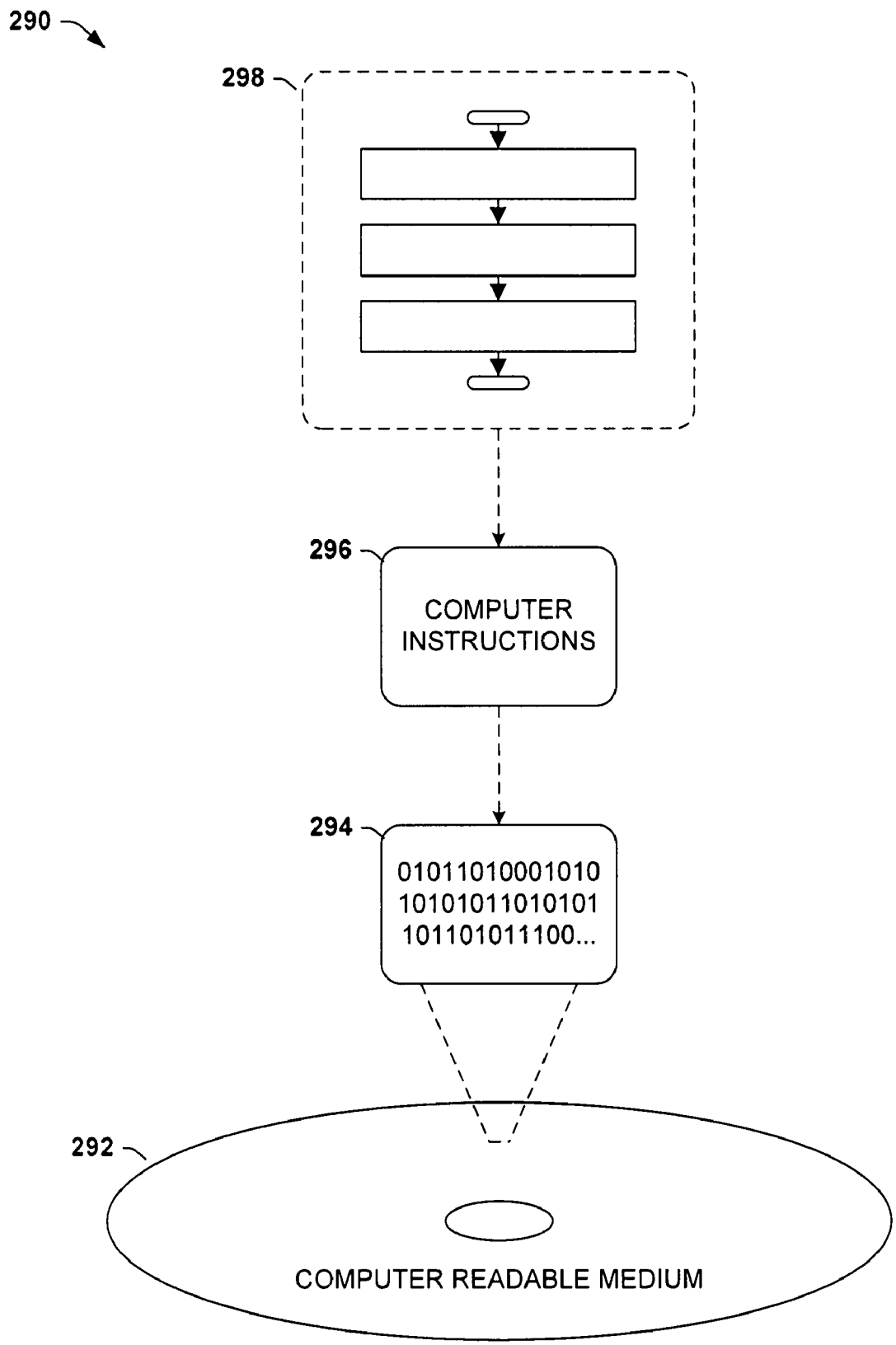
FIG. 9 is an illustration of an exemplary computer-readable medium comprising processor-executable instructions configured to perform a method or implement a system such as disclosed herein.

The techniques discussed herein may also be embodied as a computer-readable medium comprising processor-executable instructions configured to generate an aggregated user profile as discussed herein. An exemplary computer-readable medium that may be devised in these ways is illustrated in FIG. 9, wherein the embodiment 290 comprises a computer-readable medium 292 (e.g., a CD-R, DVD-R, or a platter of a hard disk drive), on which is encoded computer-readable data 294. This computer-readable data 294 in turn comprises a set of computer instructions 296 configured to operate according to the principles set forth herein. In one such embodiment, the processor-executable instructions 296 may be configured to perform a method 298 of aggregating a user profile comprising at least one user profile data item from at least one user profile server having a user profile data set, such as the exemplary method illustrated in the flowchart of FIG. 2. In another such embodiment, the processor-executable instructions 296 may be configured to implement a system for aggregating a user profile comprising at least one user profile data item from at least one user profile server having a user profile data set, such as the system illustrated in the component diagram of FIG. 3. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting, in response to a request, an aggregated user profile comprising at least one user profile data item from at least one user profile servers having respective user profile data sets, the method comprising:
   reading a user profile map comprising an aggregating logic specifying retrieval of respective user profile data items from the respective user profile data sets of the at least one user profile servers;
   retrieving at least one user profile data item from the at least one user profile servers through at least one user profile server type accessor configured to retrieve at least one user profile data item from a user profile server type according to the aggregating logic of the user profile map;
   aggregating the user profile from the at least one retrieved user profile data item according to the aggregating logic; and
   presenting the aggregated user profile in response to the request.

2. The method of claim 1, the user profile map comprising a user profile server map identifying the location of at least one of the at least two user profile servers, and the retrieving comprising locating at least one user profile server according to the user profile server map.

3. The method of claim 1, the user profile map comprising a user profile server type map identifying the user profile server type of at least one user profile server, and the retrieving comprising retrieving at least one of the user profile data items from at least one of the one or more user profile servers through the user profile server type accessor configured to retrieve at least one user profile data item from the user profile server type of the user profile server according to the user profile server type map.

4. The method of claim 1, the aggregating comprising aggregating the user profile from the at least one retrieved user profile data item describing the user according to a user profile type.

5. The method of claim 4, the retrieving comprising retrieving at least one user profile data item from the at least two user profile servers according to the aggregating logic of the user profile map for the at least one user profile data item describing the user according to the user profile type.

6. The method of claim 4, the user profile type selected according to the identity of a user profile consumer issuing the request.

7. The method of claim 4, the aggregating comprising:
including in the user profile a first user profile data item describing the user according to the user profile type, and
excluding from the user profile a second user profile data item not describing the user according to the user profile type.

8. The method of claim 4, the aggregating comprising:
aggregating a first user profile from the at least one retrieved user profile data item describing the user according to a first user profile type; and
aggregating a second user profile from the at least one retrieved user profile data item describing the user according to a second user profile type that is different from the first user profile type.

9. The method of claim 1, the user profile aggregated from at least a first user profile data item stored in a first user profile set by a first user profile server and a second user profile data item stored in a second user profile set by a second user profile server.

10. The method of claim 9, comprising: determining that the user represented by the first user profile set of the first user profile server is the user represented by the second user profile set of the second user profile server.

11. A system for presenting, in response to a request, an aggregated user profile describing a user comprising at least one user profile data item describing the user from two user profile servers having respective user profile data sets, the system comprising:
a user profile map comprising an aggregating logic specifying retrieval of respective user profile data items describing the user from the respective user profile data sets of the at least two user profile servers;
a user profile aggregator component configured to:
aggregate the user profile describing the user by retrieving at least one user profile data item describing the user from the at least two user profile servers through at least one user profile server type accessor configured to retrieve at least one user profile data item describing the user from a user profile server type according to the aggregating logic of the user profile map according to the aggregating logic; and
presenting the aggregated user profile describing the user in response to the request.

12. The system of claim 11, the user profile map comprising a user profile server map identifying the location of at least one of the at least two user profile servers, and the user profile aggregator component configured to locate at least one user profile server according to the user profile server map.

13. The system of claim 11, the user profile map comprising a user profile server type map identifying the user profile server type of at least one of the at least one user profile servers, and the user profile aggregator component configured to retrieve at least one of the user profile data items from at least one of the at least one user profile servers through the user profile server type accessor configured to retrieve at least one user profile data item from the user profile server type of the user profile server according to the user profile server type map.

14. The system of claim 11, the user profile aggregator component configured to aggregate the user profile according to a user profile type.

15. The system of claim 14, the user profile aggregator component configured to retrieve the user profile data items comprising the user profile type.

16. The system of claim 14, the user profile type selected according to the identity of a user profile consumer issuing the request.

17. The system of claim 11, comprising: a user profile map server configured to provide the user profile map to at least one user profile consumer issuing the request.

18. A method of presenting, in response to a request, an aggregated user profile comprising at least one user profile data item from at least one user profile servers having respective user profile data sets, the method comprising:
reading a user profile map comprising:
an aggregating logic specifying retrieval of respective user profile data items from the respective user profile data sets of the at least one user profile servers,
a user profile server map identifying the location of at least one of the at least one user profile servers, and
a user profile server type map identifying the user profile server type of at least one of the at least one user profile servers;
retrieving at least one user profile data item from the at least one user profile servers located according to the user profile server map, through at least one user profile accessor configured to retrieve at least one of the user profile data items from the user profile server type of the at least one user profile servers according to the user profile server type map, and according to a user profile type selected from one of an account user profile type, a shared user profile type, and an aggregate user profile type according to the identity of a user profile consumer;
aggregating the user profile from the at least one retrieved user profile data item according to the user profile type and the aggregating logic; and
presenting the aggregated user profile in response to the request.

* * * * *